(12) United States Patent
Kwon et al.

(10) Patent No.: US 10,077,004 B2
(45) Date of Patent: Sep. 18, 2018

(54) MULTI-LINK KNOB TYPE ARMREST AND ARMREST CONSOLE AND VEHICLE USING THE SAME

(71) Applicants: Hyundai Motor Company, Seoul (KR); Kia Motors Corporation, Seoul (KR); Nifco Korea Inc., Asan-si (KR)

(72) Inventors: Hyuk-Jae Kwon, Ansan-si (KR); Jae-Hyun An, Seosan-si (KR); Seung-Sik Han, Hwaseong-si (KR); In-Gyu Kim, Hwaseong-si (KR); Yoon-Hwan Shin, Asan-si (KR)

(73) Assignees: Hyundai Motor Company, Seoul (KR); Kia Motors Corporation, Seoul (KR); Nifco Korea Inc., Asan-si (KR)

( * ) Notice: Subject to any disclaimer, the term of this patent is extended or adjusted under 35 U.S.C. 154(b) by 0 days.

(21) Appl. No.: 15/348,723

(22) Filed: Nov. 10, 2016

(65) Prior Publication Data

US 2018/0009387 A1    Jan. 11, 2018

(30) Foreign Application Priority Data

Jul. 7, 2016  (KR) .................. 10-2016-0086230

(51) Int. Cl.
*B60R 7/04*    (2006.01)
*E05C 3/16*    (2006.01)
*E05B 83/32*   (2014.01)

(52) U.S. Cl.
CPC ............... *B60R 7/04* (2013.01); *E05B 83/32* (2013.01); *E05C 3/16* (2013.01)

(58) Field of Classification Search
CPC .............. B60R 7/04; E05B 83/32; E05C 3/16
USPC ...................................... 296/24.34
See application file for complete search history.

(56) References Cited

U.S. PATENT DOCUMENTS

| 7,770,953 B2 * | 8/2010 | Koarai | B60N 2/4606 |
| | | | 296/24.34 |
| 2013/0134729 A1 * | 5/2013 | Zimmerman | B60R 7/04 |
| | | | 296/24.34 |

FOREIGN PATENT DOCUMENTS

| JP | H08-113086 A | 5/1996 |
| KR | 10-2005-0058574 A | 6/2005 |
| KR | 10-1583952 B1 | 1/2016 |

* cited by examiner

*Primary Examiner* — Joseph D. Pape
*Assistant Examiner* — Dana D Ivey
(74) *Attorney, Agent, or Firm* — Morgan, Lewis & Bockius LLP (57) ABSTRACT

An armrest may include an armrest module, a sliding knob to be rotated by a manipulating force provided thereon, a hook knob facilitating rotation of the sliding knob to be converted into rotation for releasing console locking force for binding the armrest module, and a multi-link at which sloping angle rotation is generated by the rotation of the sliding knob and then converted into rotation for releasing slide locking force for binding sliding movement of the armrest module.

16 Claims, 8 Drawing Sheets

MULTI-LINK KNOB TYPE ARMREST AND ARMREST CONSOLE AND VEHICLE USING THE SAME

CROSS-REFERENCE(S) TO RELATED APPLICATIONS

The present application claims priority to Korean Patent Application No. 10-2016-0086230, filed Jul. 7, 2016, the entire contents of which is incorporated herein for all purposes by this reference.

BACKGROUND OF THE INVENTION

Field of the Invention

Various embodiments of the present invention relate to an armrest, and more particularly to an armrest having a multi-link knob applied thereto, which enables opening action for opening a console storage space after sliding action to be made continuously without risk of injury. In addition, various embodiments of the present invention also relate to an armrest console and a vehicle using such an armrest.

Description of Related Art

Typically, the armrest console for a vehicle is divided into a center fascia section, a shift lever section, and an armrest section and located in a space between a driver seat and a passenger seat.

The center fascia section is coupled to a cluster and provided with various manipulation buttons and the like, the shift lever section is provided with a shift lever for shifting gears, and the armrest section is provided with an armrest for receiving goods and/or supporting an arm or a sliding type armrest.

As an example, the sliding type armrest provides convenience which is enhanced compared to the typical armrest because it adopts a hinge structure and hence enables opening action of the armrest allowing the armrest to be bent backward in order to open a console storage space of the armrest, it adopts a hook structure and hence enables locking/unlocking operation of the armrest for blocking the console storage space, and it adopts a rail structure and hence enables forward/backward movement of the armrest according to the sliding action.

The hook structure, inter alia, adopts a latch-type hook knob that secures the armrest to the console of the armrest and provides console locking force for binding the armrest.

Therefore, when the console locking force is released by manipulating the hook knob, sliding and opening action of the armrest can occur with the armrest coupled with the armrest console.

However, the sliding type armrest also causes inconvenience due to its hinge structure, hook structure and rail structure, though it gives convenience by virtue of such structure.

For example, there is inconvenience due to discontinuity of the opening action for opening the console storage space after the sliding action of the armrest. This is caused because the console locking force that was released at the time of the sliding action is generated again after the sliding action and hence the opening action cannot be made directly after the sliding action. Therefore, opening of the console storage space brings inconvenience because it can be accomplished by following sequentially these actions: releasing the console locking force by manipulating the hook knob, backward movement (that is, toward the initial position) of the armrest, releasing the console locking force again by means of the hook knob, and then action to bend the armrest backward by grasping the armrest and raising it upward.

Most of all, the sliding type armrest has problems that since the armrest cannot be bound after its sliding action, noise is generated and risk of injury is caused.

For example, if the opening action for opening the console storage space is made under the state that the armrest incompletely slides back to its initial position, the armrest erected vertically by the opening action falls down by gravity due to its gravity weight and hence causes interior noise. In particular, since vehicle vibration transmitted to the armrest during traveling accelerates the gravitational falling speed of the armrest, risk of injury to the user by the armrest cannot do otherwise than further increasing.

The above information disclosed in this Background section is only for enhancement of understanding of the background of the invention and therefore it may contain information that does not form the prior art that is already known in this country to a person of ordinary skill in the art.

BRIEF SUMMARY

Various aspects of the present invention are directed to providing an armrest having a multi-link knob applied thereto that implements convenience of manipulation of the armrest by allowing console locking force between the armrest and an armrest console and force for fixing sliding of the armrest itself to be released simultaneously and, in particular, which allows releasing of the console locking force and generation of force for fixing sliding of the armrest to be made simultaneously after the sliding action so that opening action for opening a console storage space can be made continuously and at the same time a gravitational falling phenomenon that the armrest falls down by its gravity weight, which may result in injury to the user, is prevented.

In addition, various aspects of the present invention are directed to providing an armrest console and a vehicle using such armrest.

According to various aspects of the present invention, an armrest may include an armrest module, a sliding knob to be rotated by a manipulating force provided thereon, a hook knob facilitating rotation of the sliding knob to be converted into rotation for releasing console locking force for binding the armrest module, and a multi-link at which sloping angle rotation is generated by the rotation of the sliding knob and then converted into rotation for releasing slide locking force for binding sliding movement of the armrest module.

The hook knob may be positioned below a center of rotation of the sliding knob and the multi-link may be positioned above the center of rotation of the sliding knob.

The spring elastic force may be applied to each of the hook knob and the sliding knob, the spring elastic force being exerted as elastic restoring force when the hook knob and the sliding knob are returned to their initial states.

A hook pushed end which is pushed by the rotation of the sliding knob may be formed in the hook knob so as to extend toward one direction from a center of rotation of the sliding knob and a hook pushing end for pressing the hook pushed end may be formed in the sliding knob to extend toward the one direction from the center of rotation of the sliding knob.

The multi-link may include a link bar having linear movement generated by the sloping angle rotation, an interlock of which rotation is caused by the linear movement of the link bar and then converted into reverse rotation after pressing against the hook knob for the console locking force to be released at a position after the armrest module moves by a sliding stroke, and a sliding hook which is rotated by the rotation of the interlock to release the slide locking force for binding sliding movement of the armrest module and generates the slide locking force at the position after the armrest module moves by a sliding stroke.

The sloping angle rotation may include sloping angle rotation of the sliding knob caused by a separation distance shared by the link bar and a center of rotation of the sliding knob and sloping angle rotation of the interlock caused by a separation distance shared by the link bar and a center of rotation of the interlock, the linear movement may be formed by both the sloping angle rotation of the sliding knob and the sloping angle rotation of the interlock, the rotation of the interlock may be generated by the separation distance shared by the link bar and the center of rotation of the interlock, and the rotation of the sliding hook may be generated through pushing by the rotation of the interlock applied from a position deviated from a center of rotation of the sliding hook.

The link bar may be a straight link bar body.

The interlock may be an interlock body having a center of rotation offset to one side, the interlock body may include upper and lower pushing ends extended therefrom toward an opposite side of the center of rotation, the upper pushing end may rotate the sliding hook at a position before the armrest module moves by the sliding stroke, and the lower pushing end may press against the hook knob to release the console locking force at a position after the armrest module moves by the sliding stroke and simultaneously converts the rotation of the interlock to the reverse rotation by reaction force of the hook knob.

The upper pushing end and the lower pushing end may form an open "C" shape in cross section.

The sliding hook may be a sliding hook body having a center of rotation offset to one side so that rotation of the sliding hook body is generated by the interlock and the slide locking force is released by the rotation of the sliding hook.

Spring elastic force may be applied to the sliding hook body and the spring elastic force may be exerted as elastic restoring force when the sliding hook is returned to its initial state.

The multi-link may further include an interlock cover, the interlock cover allowing the link bar and the interlock and the sliding hook to be integrally assembled in a series arrangement.

The rotation of the sliding knob, the rotation of the hook knob, and the rotation of the multi-link may be generated about respective pins thereof, and the pins may be bound by E rings.

The armrest module may be coupled to the hinge module and the hinge module may be formed as a hinge center of the armrest module when the armrest module is operated to be bent backward.

According to various aspects of the present invention, an armrest console may include an armrest comprising an armrest module, a hinge module for forming a hinge center of the armrest module when the armrest module is operated to be bent backward, a sliding knob to be rotated by a manipulating force, a hook knob facilitating rotation of the sliding knob to be converted into rotation for releasing console locking force for binding the armrest module, and a multi-link at which sloping angle rotation is generated by the rotation of the sliding knob and then converted into rotation for releasing slide locking force for binding sliding movement of the armrest module, and a console storage space exposed to the outside by bending the armrest backward.

The console storage space may be formed at an armrest section and a shift lever section and a center fascia section are connected to the armrest section.

According to various aspects of the present invention, a vehicle may include an armrest comprising an armrest module, a hinge module for forming a hinge center of the armrest module when the armrest module is operated to be bent backward, a sliding knob to be rotated by a manipulating force, a hook knob facilitating rotation of the sliding knob to be converted into rotation for releasing console locking force for binding the armrest module, and a multi-link at which sloping angle rotation is generated by the rotation of the sliding knob and then converted into rotation for releasing slide locking force for binding sliding movement of the armrest module, and an armrest console comprising an armrest section having a console storage space to be opened and closed by the armrest, a shift lever section connected to the armrest section, and a center fascia section connected to the shift lever section, and positioned between a driver seat and a passenger seat.

An armrest according to various embodiments of the present invention may include a multi-link module for providing console locking force between the armrest and the armrest console and slide locking force for locking sliding of the armrest itself, so that various embodiments of the present invention have advantages and effects as follows.

First, sliding action and opening action of the armrest can be done continuously by associating the sliding knob for providing the slide locking force with the hook knob for providing the console locking force. Second, since the console locking force is released after the sliding action, there is no need to manipulate either the sliding knob or the hook knob at the time of opening action, thereby providing convenience to users. Third, since the slide locking force is formed after the sliding action, the armrest erected vertically after the opening action is prevented from falling down by gravity due to its gravity weight and vehicle vibration, thereby eliminating risk of injury to users. Fourth, since manipulating force of the sliding knob is converted into linear movement by means of sloping angle rotation of the link, accuracy of transmitting force for releasing and forming the console locking force and the slide locking force is maintained so that it is possible to distinguish a link structure mechanism for transmitting force. Fifth, a sliding type armrest is applied to an armrest console and hence convenience of forward and backward movement and of opening of the console storage space is enhanced, so that customer's complain that occurred in the existing sliding type armrest can be resolved. Sixth, by applying the armrest console having the sliding type armrest to a vehicle, it is possible to avoid risk of injury to users due to gravity falling of the armrest and thereby enhance marketability of the vehicle.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
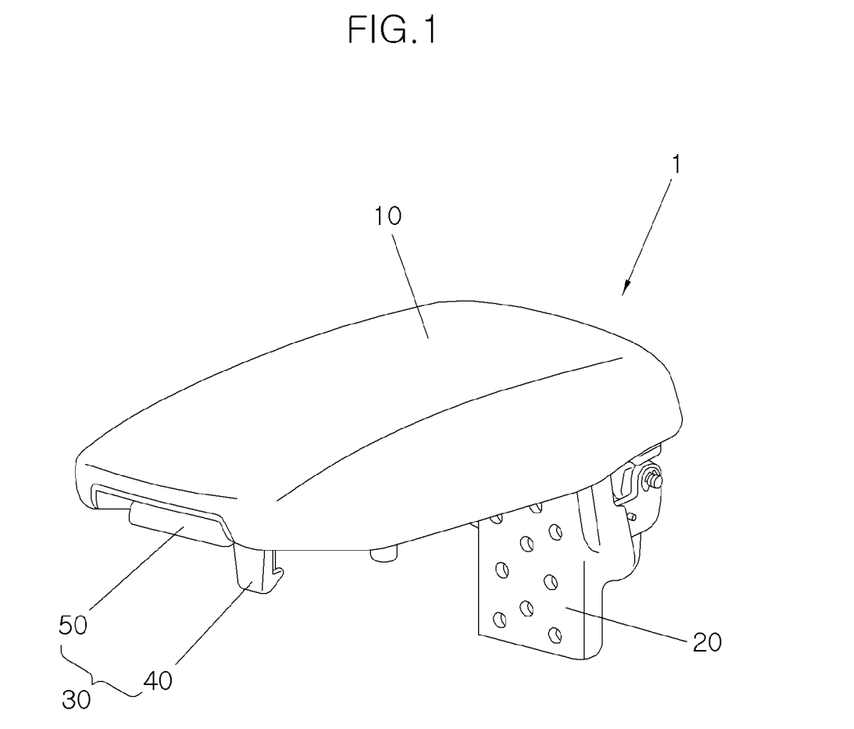
FIG. 1 is a perspective view of an armrest having a multi-link knob applied thereto according to various embodiments of the present invention.

Referring to FIG. 1, an armrest 1 includes an armrest module 10, a hinge module 20 coupled to the armrest module 10, and a multi-link module 30 associated with a hook knob 40 and a sliding knob 50 and built into the armrest module 10.

For example, the armrest module 10 forms an exterior design. The hinge module 20 is coupled to one end of the armrest module while the multi-link knob module 30 is coupled to the opposite end of the armrest module with the hook knob 40 and the sliding knob 50 exposed to the outside. As the hinge module 20 is coupled to one end of the armrest module 10, it enables opening action of the armrest module 10 that the armrest module is bent backward when opening a console storage space. As the multi-link knob module 30 is adapted to associate manipulation of the sliding knob 50 with the hook knob 40, convenience is achieved in that forward and rearward sliding action of the armrest module 10 is performed by manipulation of the sliding knob 50. In particular, the multi-link knob module 30 is configured in such a manner that a multi-link 60 associated with the hook knob 40 and the sliding knob 50 is built in the armrest module 10 (see FIG. 3). Therefore, since console locking force of the hook knob 40 is released and slide locking force of the armrest module 10 is generated after the sliding action, and hence continuity of opening action following the sliding action is achieved, releasing of the console locking force by the hook knob 40 is not required.

Figure 2:
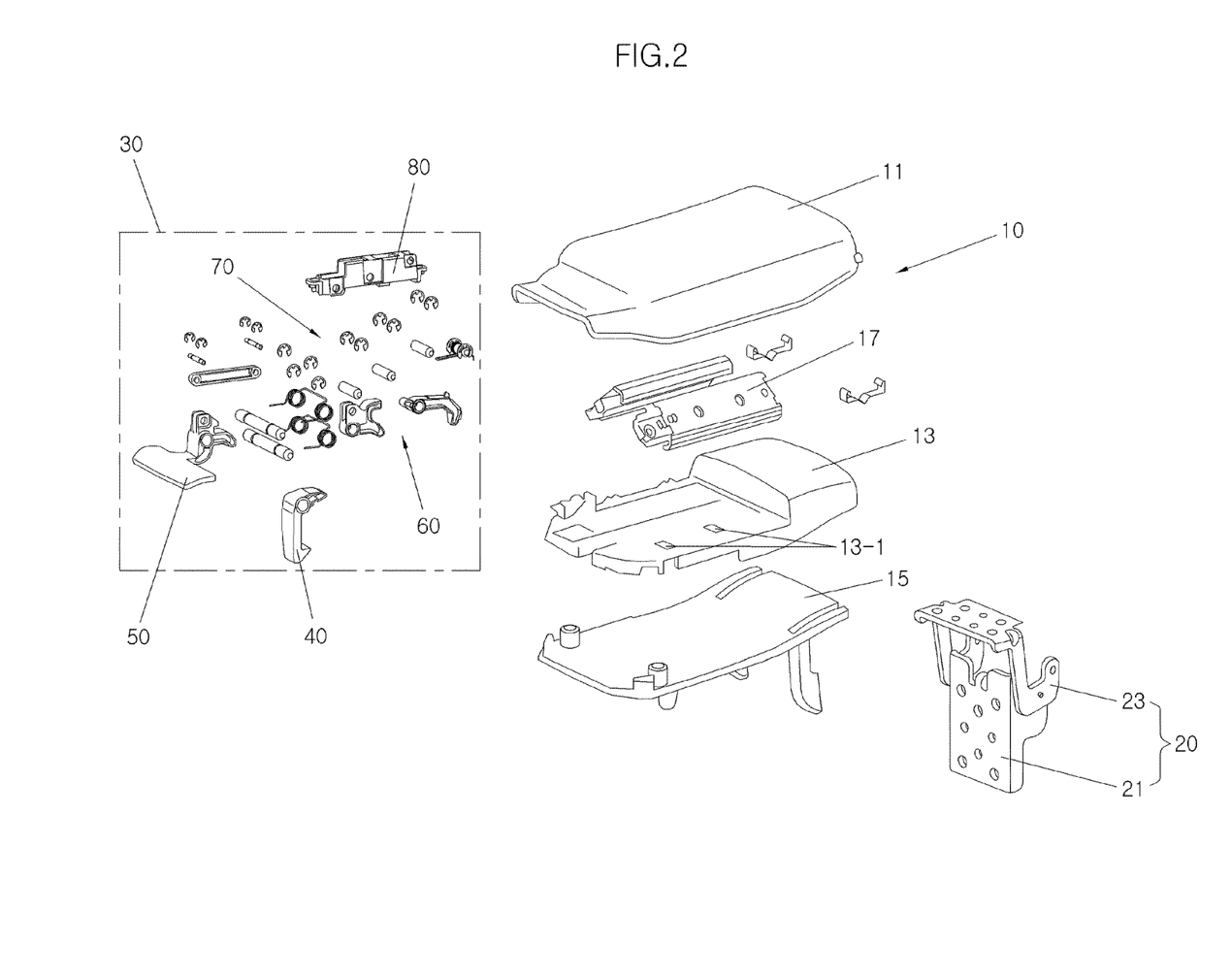
FIG. 2 is an exploded view of the armrest according to various embodiments of the present invention.

In the interim, detailed configuration of the armrest module 10 and the hinge module 20 is illustrated in FIG. 2.

As illustrated, the armrest module 10 includes a sliding body 11, a base plate 13, a hinge plate 15, and a rail bar 17 as main components. Specifically, the sliding body 11 allows the base plate 13 and the hinge plate 15 and the rail bar 17 to be coupled to a lower part thereof and hence forms an appearance of the armrest module 10. If desired, a pad such as polyurethane foam, sponge and the like is attached on the sliding body. The base plate 13 is coupled to the lower part of the sliding body 11 together with the rail bar 17 so that relative movement of the sliding body 11 via the rail bar 17 results in a sliding action. The hinge plate 15 is coupled to the base plate 13 and then arranged in the lower part of the sliding body 11 so that it provides a place to which the hinge module 20 is coupled. The rail bar 17 enables the sliding body 11 to slide in the state that the sliding body is coupled to the base plate 13.

In particular, the base plate 13 is formed with two sliding hook holes 13-1 at positions spaced apart from each other. The two sliding hook holes 13-1 are different from each other in terms of the degree of contributing to forming slide locking force of the multi-link knob module 30 according to the sliding action of the sliding body 11. For example, one sliding hook hole 13-1 positioned ahead of the other of the two sliding hook holes may provide slide locking force to multi-link knob module 30 at a position after the sliding body 11 slides, while the other sliding hook hole 13-1 positioned behind said one sliding hook hole may provide slide locking force to multi-link knob module 30 at a position after the sliding body 11 slides back to its initial position.

As such, the armrest module 10 adopts as its components the sliding body 11, the base plate 13, the hinge plate 15, and the rail bar 17 which are the same as in a conventional sliding type armrest module, except for location and structure of the sliding hook holes 13-1.

As shown in the drawings, the hinge module 20 comprises a fixing plate 21 and a hinge plate 23. Specifically, the fixing plate 21 is coupled to other part (e.g., armrest section 100-3 in FIG. 5) and the hinge plate 23 is coupled to the hinge plate 15 in the state that it is hinged with the fixing plate 21, allowing the armrest module 10 to take opening action.

Therefore, the hinge module 20 is the same component as the hinge module applied to a conventional sliding type armrest module.

Figure 3:
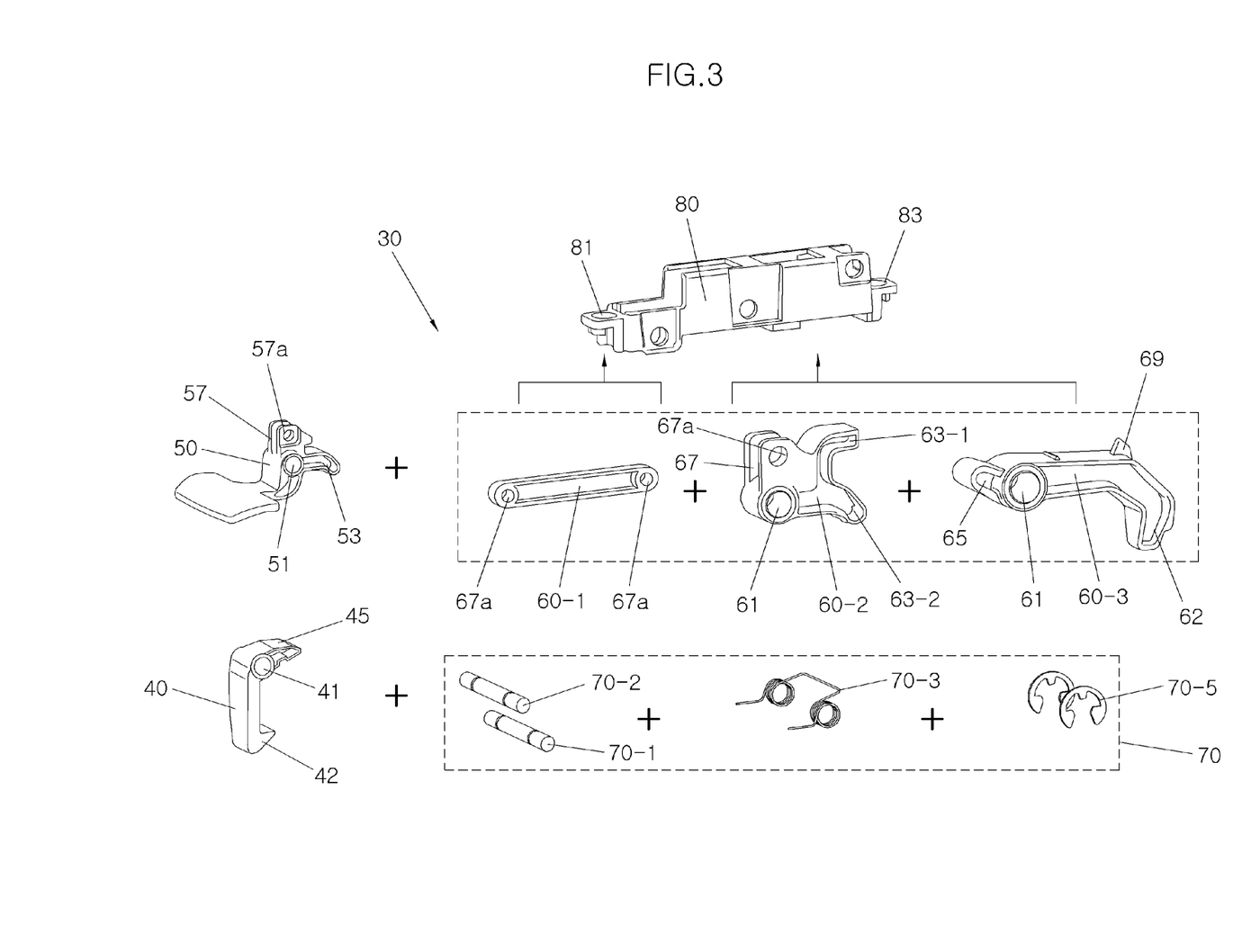
FIG. 3 is an exploded view of a multi-link knob module according to various embodiments of the present invention.
Figure 4:
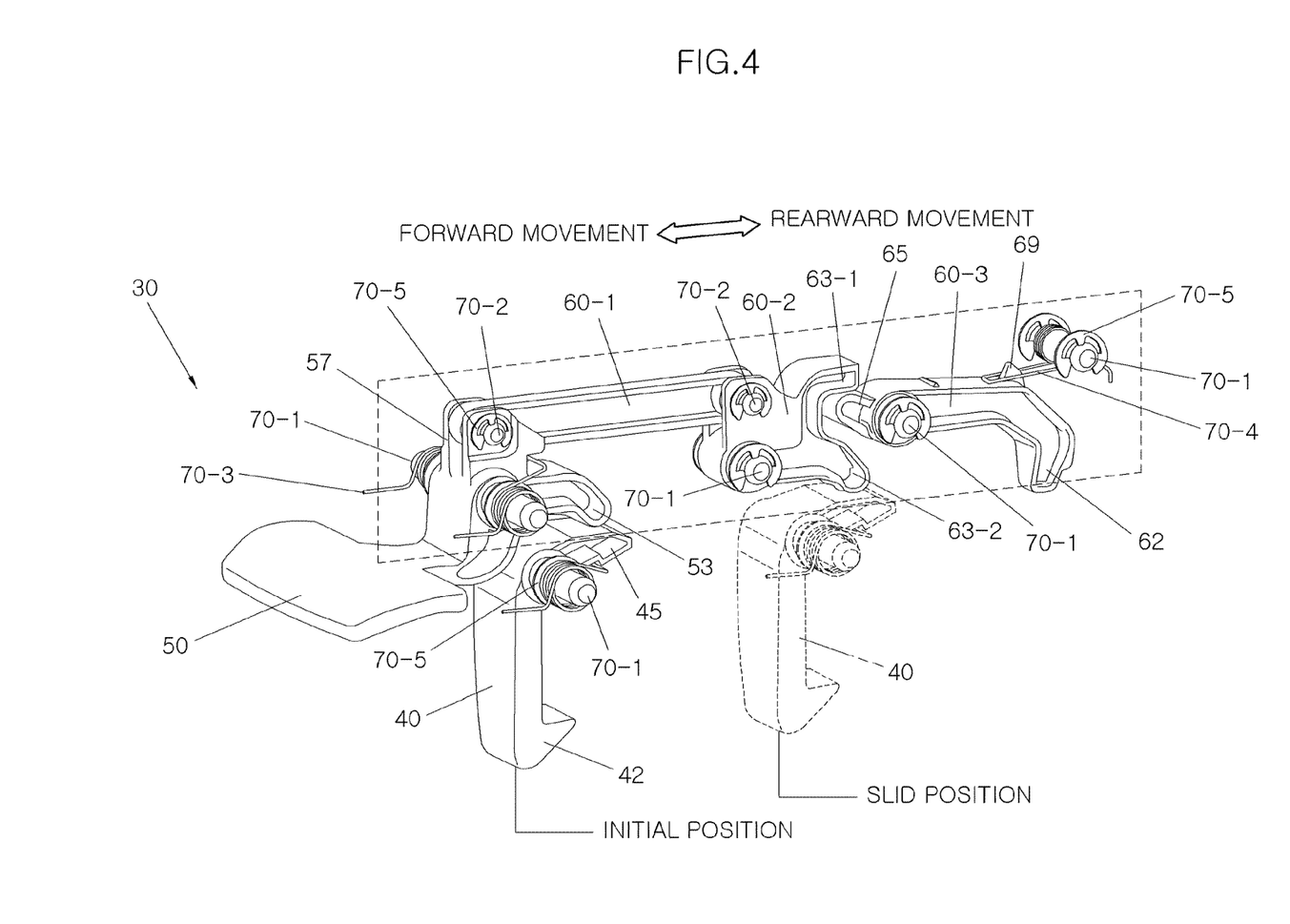
FIG. 4 is an assembled view of a multi-link knob module according to various embodiments of the present invention.

On the other hand, FIGS. 3 and 4 illustrate detailed configuration of a multi-link knob module 30.

FIG. 3 is an exploded view of the multi-link knob module 30. The multi-link knob module 30 includes a hook knob 40, a sliding knob 50, a multi-link 60 including a link bar 60-1, an interlock 60-2 and a sliding hook 60-3, accessories 70; and an interlock cover 80.

When the multi-link knob module 30 is assembled, the multi-link 60 and the accessory 70 and the interlock cover 80 are built in between the sliding body 11 and the base plate 13 while the hook knob 40 and the sliding knob 50 are exposed to the outside.

When the multi-link module knob 30 is actuated by manipulating the sliding knob 50, the hook knob 40 is rotated by movement of the sliding knob 50 and hence console locking force is released upon sliding action. At the same time, as the hook knob 40 is linked with movement of the multi-link 60, console locking force is released even after the sliding action. The multi-link 60 allows sloping angle movement of the link bar 60-1 to be generated by the sliding movement of the knob 50 so that slide locking force is released for sliding action to occur. At the same time, the multi-link 60 allows sloping angle movement in a reverse direction to be generated during the sliding action so that slide locking force is generated again after the sliding action.

Specifically, the hook knob 40 is formed of a hook knob body in which a hinge hole 41 that is a center of rotation is formed, a console catch end 42 for forming console locking force is formed into a hook structure that is bent downward from the hinge hole 41, and a hook pushed end 45 for releasing the console locking force is formed into a projection structure that is extended laterally from the hinge hole 41. As a result, the hook knob 40 receives manipulating force of the sliding knob 50 directly from the hook pushed end 45 while the hinge hole 41 works as the center of clockwise rotation of the console catch end 42 for releasing the console locking force.

Specifically, the sliding knob 50 is formed of a grip knob body having a grip shaped portion for allowing manipulation by a finger and a hinge hole 51 for a center of rotation, wherein a hook pushing end 53 for manipulating the hook knob 40 is formed into a projection structure extending laterally from the hinge hole 51 and a forward link projection 57 for sloping angle rotation of the link bar 60-1 is formed into a slit structure protruding upward from the hinge hole 51. In particular, a fixing hole 57a is formed through the forward link projection 57 to form a center of sloping angle movement of the link bar 60-1.

Figure 7:
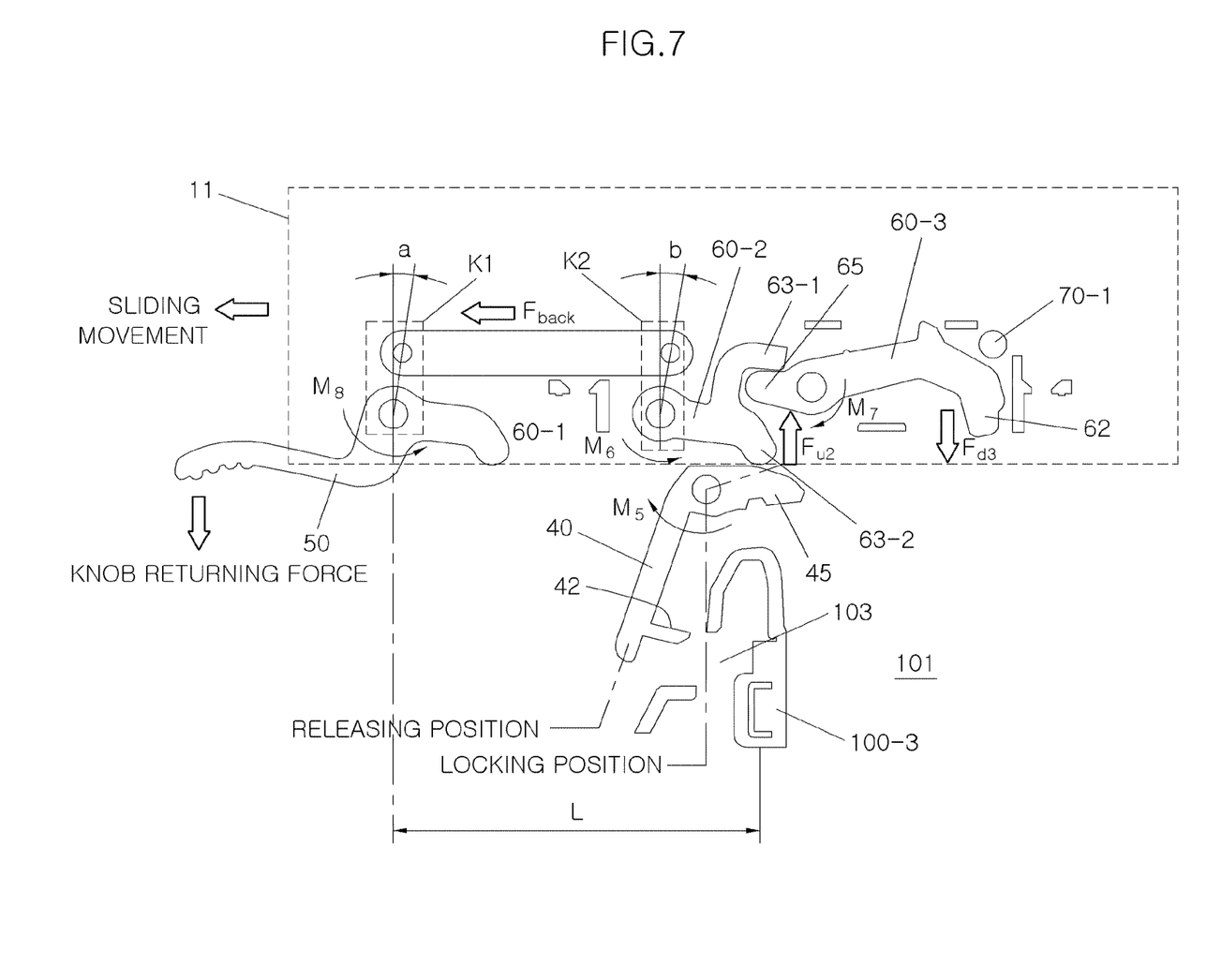
FIG. 7 is a view illustrating an operational state that the multi-link module knob releases the console locking force and at the same time generates the slide locking force after the sliding action of the armrest according to various embodiments of the present invention.

Specifically, the link bar 60-1 is formed of a link body having fixing holes 67a perforating the opposite ends thereof, wherein length of the link body is determined as a sliding stroke L set in the arm rest module 10 (see FIG. 7). The interlock 60-2 is formed of an interlock body having a hinge hole 61 for a center of rotation, wherein interlock pressure ends 63-1 and 63-2 for manipulating the sliding hook 60-3 are formed into a projection structure extending laterally from the hinge hole 61 and a rearward link projection 67 for sloping angle movement linked with the link bar 60-1 is formed into a slit structure protruding upward from the hinge hole 61. In particular, the interlock pressure end is divided into an upper pushing end 63-1 protruding horizontally at an upper portion of the interlock body and a lower pushing end 63-2 protruding downward at a lower portion of the interlock body, which form a projection structure having a substantially open "c" shape in cross section. In addition, a fixing hole 67a is formed through the rearward link projection 67 to form a center of sloping angle movement of the link bar 60-1. The sliding hook 60-3 is formed of a sliding hook body of which one end is formed with a hinge hole 61 for a center of rotation and the other end forms an armrest catch end 62 for generating slide locking force, wherein an interlock pushed end 65 is projected from the hinge hole 61 side at an inclined angle with respect the sliding hook body and a spring projection 69 is projected from the sliding hook body at the armrest catch end 62 side.

Specifically, the accessory 70 comprises a hinge pin 70-1, a fixing pin 70-2, a knob spring 70-3, a hook spring 70-4 (see FIG. 4), and E-rings 70-5.

Specifically, the interlock cover 80 allows the link bar 60-1 and the interlock 60-2 and the sliding hook 60-3 to be inserted and assembled thereto and hence forms a single assembly with the multi-link 60. To this end, the interlock cover 80 is formed of an interlock cover body having an open structure with pin holes perforated, wherein both ends of the interlock cover body is provided with a forward fixing end 81 and a rearward fixing end 83 respectively and the interlock cover is fastened to the armrest module 10 (e.g., base plate 13) with bolts by means of the forward fixing end 81 and the rearward fixing end 83.

Referring to FIG. 4 illustrating an assembled state of the multi-link knob module 30, each hinge pin 70-1 is inserted into each of hinge holes 41, 51 and 61 of the hook knob 40, the sliding knob (50), the interlock 60-2 and the sliding hook 60-3 and serves as a center of rotation. Each fixing pin 70-2 is inserted into each of fixing holes 57a and 67a of the sliding knob 50, the link bar 60-1 and the interlock 60-2 and serves as a center of sloping angle movement of the link bar 60-1. The knob spring 70-3 is linked with the hinge pin 70-1 and coupled to the hook knob 40 and the sliding knob 50 respectively, thereby imparting elastic force to the hook knob 40 and the sliding knob 50 to be returned to their initial states after they are manipulated. The spring hook 70-4 is linked with the hinge pin 70-1 and caught on the spring projection 69 of the sliding hook 60-3, thereby imparting an elastic force to the sliding hook 60-3 to be returned to a locked state after slide locking force is released. E-rings 70-5 restrain hinge pins 70-1 and locking pins 70-2 not to be separated respectively.

As a result, the link bar 60-1 is positioned behind the sliding knob 50 by being fixed to the sliding knob 50 by the fixing pin 70-2, the interlock 60-2 is positioned behind the link bar 60-1 by being fixed to the link bar 60-1 by another fixing pin 70-2, and the sliding hook 60-3 is positioned behind the interlock 60-2 by being inserted into the projection structure having an open shape in cross section of the upper and lower pushing ends 63-1 and 63-2.

Accordingly, forward and backward movement of the sliding body 11 for sliding action of the armrest module 10 brings forward and backward movement of the link bar 60-1 and the interlock 60-2 and the sliding hook 60-3 together with the sliding knob 50. On the other hand, as the hook knob 40 does not follow the forward and backward movement of the sliding body 11, releasing of the console locking force at the time of starting the sliding action is achieved by the action that the hook body contacts with the sliding knob 50, whereas releasing of the console locking force after the sliding action is achieved by the action that the hook body contacts with the interlock 60-2.

To this end, a rotational angle of the hook knob 40 is set to exceed an operation angle (i.e., an angle between a position where the console locking force is locked and a position where the console locking force is released). For example, a rotational angle formed when the interlock 60-2 starts to push the hook knob 40 is reduced to the operation angle as the interlock 60-2 passes over the hook knob 40 while contacting it. As a result, the hook knob 40 can maintain the state of releasing the console locking force even when the rotational angle is reduced to the operation angle, In addition, as the interlock 60-2 manipulates the hook knob 40 and is also manipulated by the hook knob 40, it is possible to maintain again in the locked state, the slide locking force that has been released by the sliding knob 50.

Therefore, a sliding stroke L (see FIG. 7) of the multi-link knob module 30 is determined by a distance from a contact position between the sliding knob 50 and the hook knob 40 to a contact position between the interlock 60-2 and the hook knob 40. A distance between two sliding hook holes 13-1 to which the armrest catch end 62 of the sliding hook 60-3 coupled is the same as the sliding stroke L (see FIG. 7).

Figure 5:
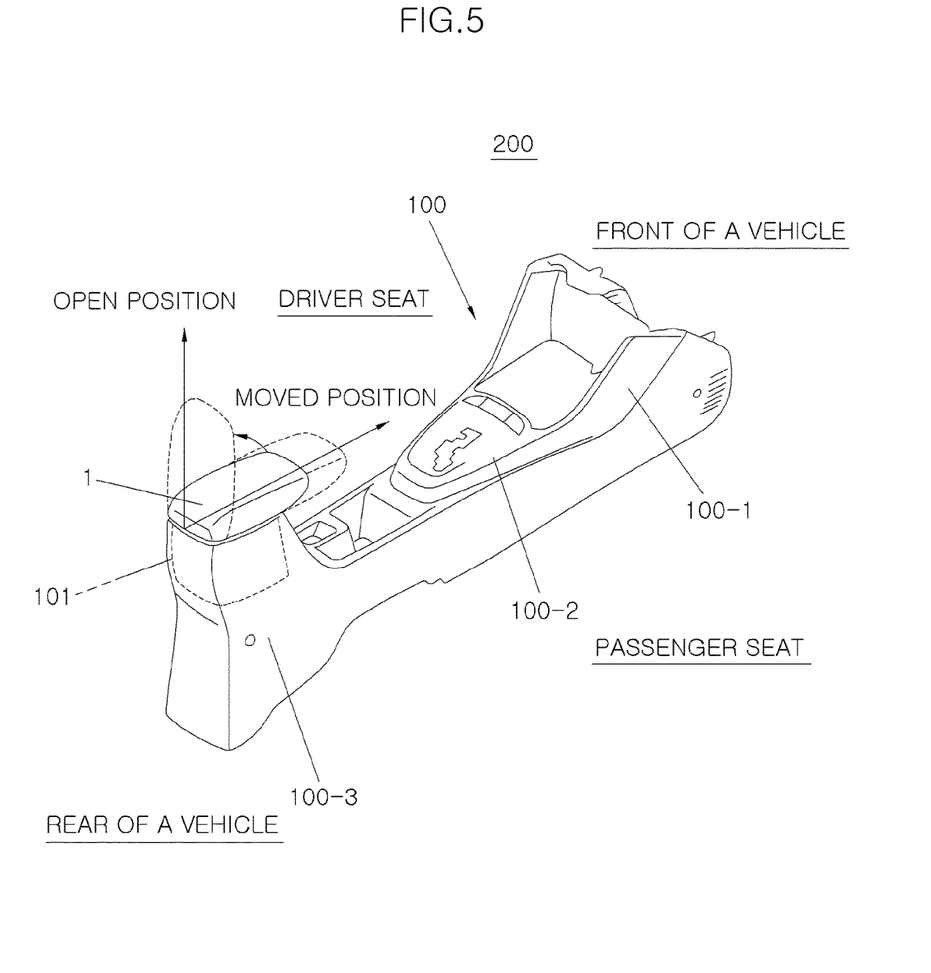
FIG. 5 is a schematic perspective view of an example in which the armrest according to various embodiments of the present invention is applied to an armrest console of a vehicle.

FIG. 5 illustrates an example that the armrest console with an armrest having the multi-link knob applied thereto is applied to a vehicle.

As shown in the figure, the vehicle 200 is divided into a center fascia section 100-1, a shift lever section 100-2, and an armrest section 100-3 and comprises an armrest console 100 arranged on a boundary region between a driver seat and a passenger seat and an armrest 1 arranged on the armrest section 100-3.

Specifically, the center fascia section 100-1 is coupled to a cluster and provided with various manipulation buttons and the like, the shift lever section 100-2 is provided with a shift lever for shifting gears, and the armrest section 100-3 is provided with a console storage space 101.

Specifically, the armrest 1 performs the opening action that is bent backward via a hinge to open the console storage space 101 along with the sliding action for forward and backward movement. Therefore, the armrest 1 includes the sliding body 11, the base plate 13 having two sliding hook holes 13-1 formed thereon, the hinge plate 15, the rail bar 17, the fixing plate 21, the hinge plate 23, the hook knob 40, the sliding knob 50, the link bar 60-1, the interlock 60-2, the sliding hook 60-3, the accessory 70, and the interlock cover 80, and is the same as the armrest 1 that can perform the sliding action for forward and rearward movement and the opening action for opening the console storage space 101 as described with reference to FIGS. 1 to 4.

Figure 6:
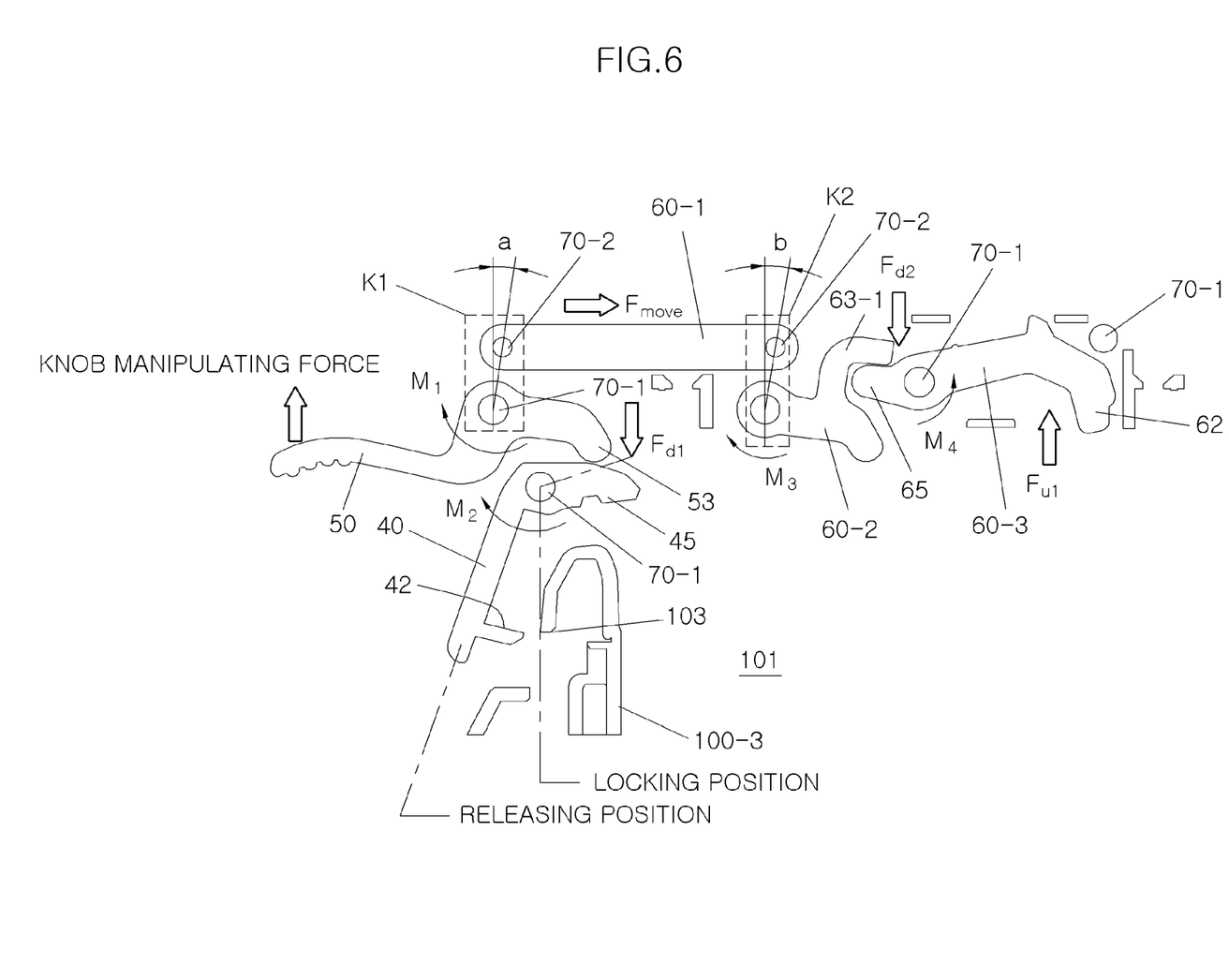
FIG. 6 is a view illustrating an operational state that the multi-link module knob releases simultaneously the console locking force and the slide locking force upon sliding action of the armrest according to various embodiments of the present invention.

FIGS. 6 and 7 illustrate operation of the multi-link knob module 30 during the sliding action for forward movement of the armrest 1. In this case, the forward movement means that the sliding body 11 performs the sliding action. In addition, the user's manipulation is divided into two cases one is that the sliding knob 50 is manipulated to release only the console locking force of the hook knob 40 in order to open the arm rest module 10 and another is that the sliding knob 50 is manipulated to release both the console locking force of the hook knob 40 and the slide locking force of the sliding hook 60-3 in order to perform the sliding action for forward and backward movement of the arm rest module 10. These two cases can be done by controlling user's force manipulating the sliding knob 50. Therefore, user's manipulating force applied to the sliding knob 50 to release both the console locking force and the slide locking force is greater than user's manipulating force applied to the sliding knob 50 to release only the console locking force.

Referring to FIG. 6 illustrating the initial operation performed by the multi-link knob module 30 at the time of starting the sliding action, the user's manipulating force acting on the sliding knob 50 brings the sliding knob 50 to rotate clockwise M1 about the hinge pin 70-1 as the center of rotation. Then, the clockwise rotation M1 of the sliding knob generates downward pressing force $F_{d1}$ of the sliding knob on the hook pushing end 53 and thereby the hook knob 40 is pressed via the hook pushed end 45. As a result, the hook knob 40 rotates clockwise M2 about the hinge pin 70-1 as the center of rotation and hence the console catch end 42 is spaced apart from the hook catch hole 103, thereby releasing console locking force.

Then, a further clockwise rotation M1 of the sliding knob is generated by increasing the user's manipulating force acting on the sliding knob 50. This clockwise rotation M1 of the sliding knob generates sloping angle rotation a of the link bar 60-1 with respect to the sliding knob laterally at a sloping angle generation portion K1 of the sliding knob 50 and hence the link bar 60-1 is forced to move backward (i.e., in a direction toward behind the sliding knob 50) via the fixing pin 70-2. As a result, the link bar 60-1 generates rearward movement $F_{move}$.

Then, the rearward movement $F_{move}$ of the link bar generates sloping angle rotation b of the link bar 60-1 with respect to the interlock at a sloping angle following portion K2 of the interlock 60-2 and thereby it is converted into clockwise rotation M3 of the interlock 60-2 via the fixing pin 70-2 about the hinge pin 70-1 as a center of rotation. Then, the clockwise rotation M3 of the interlock generates downward interlock pressing force $F_{d2}$ that the upper pushing end 63-1 presses the interlock pushed end 65 and thereby counterclockwise rotation M4 of the sliding hook 60-3 via the hinge pin 70-1 is generated. As a result, the armrest catch end 62 of the sliding hook 60-3 exits out of the sliding hook hole 13-1 by means of upward pressing force $F_{u1}$ of the sliding hook, thereby releasing the slide locking force. At this time, the hook spring 70-4 is elastically deformed by the upward pressing force $F_{u1}$ of the sliding hook and provides elastic force to the sliding hook 60-3 when the sliding hook is returned to its initial position.

As such, the knob manipulating force acting on the sliding knob 50 releases the console locking force of the hook knob 40 and moves the link bar 60-1, the link bar 60-1 moves the interlock 60-2, and the interlock 60-2 releases the slide locking force of the sliding hook 60-3, with the result that the armrest module 10 is converted into the forward sliding state.

Referring FIG. 7 illustrating the state after the multi-link knob module 30 performs the sliding action, user's sliding manipulation force is applied to the armrest module 10 for forward movement of the armrest module in the state that the sliding hook 60-3 exits out of the sliding hook hole 13-1 of the base plate 13 and the slide locking force is released. Then, the sliding body 11 is separated from the base plate 13 via the rail bar 17 and thereby the sliding knob 50, the link bar 60-1, the interlock 60-2 and the sliding hook 60-3 are also moved together in the direction of forward movement of the sliding body 11. As a result, downward pressing force $F_{d1}$ of the sliding knob 50 (see FIG. 6) disappears and thereby the hook knob 40 is returned to its initial state by elastic restoring force of the knob spring 70-3. This causes the hook knob 40 to form again console locking force.

Next, when the armrest module 10 reaches the sliding stroke L and then the state after the sliding action is formed, the lower pushing end 63-2 of the interlock 60-2 contacts with the hook pushed end 45 of the hook knob 40. The contact between the lower pushing end 63-2 and the hook pushed end 45 generates clockwise rotation M5 of the hook knob 40 and counterclockwise rotation M6 of the interlock 60-2 at the same time. At this time, the clockwise rotation M5 of the hook knob is formed at an amount of an angle generated at a position where the lower pushing end 63-2 starts to press the hook pushed end 45. In addition, regarding the counterclockwise rotation M6 of the interlock, since a rotational angle at a position where the lower pushing end 63-2 passes over the hook pushed end 45 while contacting with the hook pushed end is reduced to an operation angle, the counterclockwise rotation M6 of the interlock is formed at an amount of the difference between the rotational angle and the operational angle.

As a result, the clockwise rotation M5 of the hook knob releases the console locking force of the hook knob 40 while the counterclockwise rotation M6 of the interlock is converted into movement of the link bar 60-1 and the sliding hook 60-3.

Specifically, the counterclockwise rotation M6 of the interlock generates upward interlock pressing force $F_{u2}$ of the upper pushing end 63-2 and releases the downward interlock pressing force $F_{d2}$ of the upper pushing end 63-1. As a result, elastic restoring force of the hook spring 70-4 generates clockwise rotation M7 of the sliding hook 60-3. Then, the clockwise rotation M7 of the sliding hook allows the armrest catch end 62 to be inserted into the sliding hook hole 13-1 by the downward pressing force $F_{d3}$ of the sliding hook and thereby slide locking force is generated again.

Specifically, the counterclockwise rotation M6 of the interlock generates sloping angle rotation b of the link bar 60-1 with respect to the interlock laterally at the sloping angle following portion K2 of the interlock 60-2 and thereby the link bar 60-1 is forced to move forward (a direction toward the sliding knob 50). As a result, the link bar 60-1 occurs link bar returning movement $F_{back}$ wherein the link bar returning movement $F_{back}$ generates sloping angle rotation a of the link bar 60-1 with respect to the sliding knob at the sloping angle generation portion K1 of the sliding knob 50. Then, the sloping angle rotation a with respect to the sliding knob generates counterclockwise rotation M8 of the sliding knob 50. As a result, the sliding knob 50 is converted into a non-manipulated state, counteracting to the user's manipulating force on the sliding knob.

Therefore, when the arm rest module 10 is converted into the state after the sliding action that it reaches the sliding stroke L, the hook knob 40 is maintained in the state that console locking force is released, the sliding knob 50 is maintained in the non-manipulated state, and the sliding hook 60-3 maintains the slide locking force. At this time, the armrest module 10 is in a state of blocking the console storage space 101.

Figure 8:
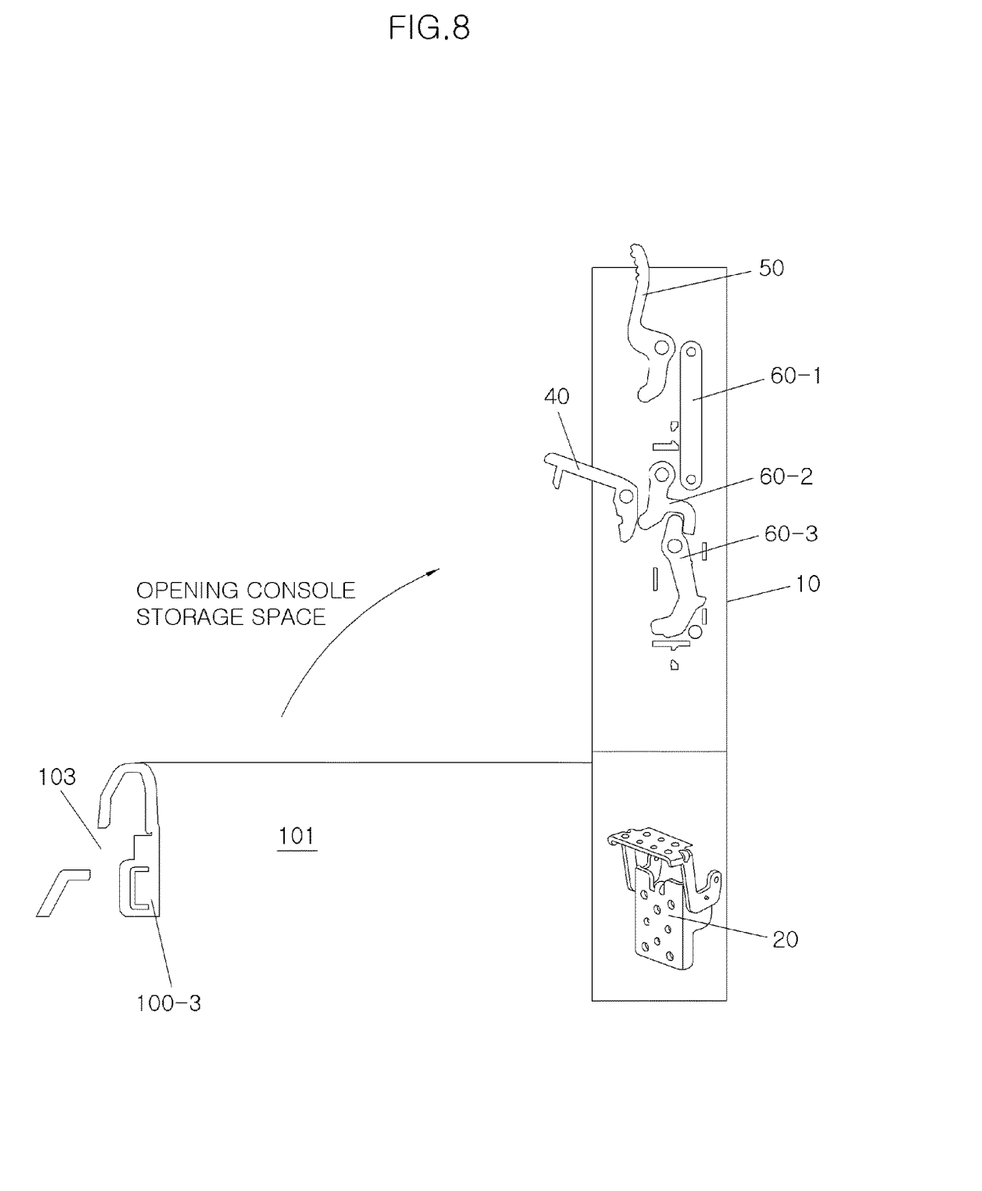
FIG. 8 is a view illustrating a state that the console storage space is opened by a continuous opening action after the sliding action of the armrest according to various embodiments of the present invention.

On the other hand, FIG. 8 illustrates the state that the console storage space 101 of the armrest console 100 is opened.

As shown in this figure, opening of the console storage space 101 of the armrest console 100 is achieved by opening action of the arm rest module 10 using hinge function of the hinge module 20. In this case, the opening action is divided into two types as follows.

First, there is opening action taking place without sliding action of the armrest module 10. In this case, as described with reference to FIG. 6, the user manipulates the sliding knob 50 with a small force and allows only console locking force of the hook knob 40 to be released, and then seizes and lifts up the armrest module 10 and bends it backward. As a result, the armrest module 10 is erected vertically via the hinge module 20 and hence the console storage space 101 is opened.

Second, there is opening action taking place in the state after the sliding action for forward movement of the armrest module 10. In this case, as described with reference to FIG. 7, since the console locking force is released by the sliding action of the armrest module 10 console but the slide locking force is maintained, the user simply seizes and lifts up the armrest module 10 and bends it backward. As a result, the armrest module 10 is erected vertically via the hinge module 20 and hence the console storage space 101 is opened.

Therefore, the user can manipulate either the hook knob 40 or the sliding knob 50, or otherwise open the console storage space 101 without an action to return the armrest module 10 to its initial position even in a state that the armrest module 10 is moved forward.

As described above, the armrest 1 according to various embodiments includes a sliding knob 50 to be rotated by means of manipulating force, a hook knob 40 enabling rotation of the sliding knob 50 to be converted into rotation for releasing console locking force for binding an armrest module 10, and a multi-link 60 at which sloping angle rotation by the rotation of the sliding knob 50 is converted into rotation for releasing slide locking force for binding sliding movement of the armrest module 10 wherein by applying the armrest 1 to the armrest console 100 as a sliding type armrest, continuous opening action following sliding action of the armrest 1 can be done and, in particular, the gravity falling of the armrest 1, which occurred due to its gravity weight and vehicle vibration in the state that the console storage space 101 is opened, is prevented and hence risk of injury to users by the armrest 1 is eliminated.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:
1. An armrest comprising:
  an armrest module;
  a sliding knob to be rotated by a manipulating force provided thereon;
  a hook knob facilitating rotation of the sliding knob to be converted into rotation for releasing console locking force for binding the armrest module; and
  a multi-link at which sloping angle rotation is generated by the rotation of the sliding knob and then converted into rotation for releasing slide locking force for binding sliding movement of the armrest module,
  wherein the multi-link comprises:
    a link bar having linear movement generated by the sloping angle rotation;
    an interlock of which rotation is caused by the linear movement of the link bar and then converted into reverse rotation after pressing against the hook knob for the console locking force to be released at a position after the armrest module moves by a sliding stroke; and
    a sliding hook which is rotated by the rotation of the interlock to release the slide locking force for binding sliding movement of the armrest module and generates the slide locking force at the position after the armrest module moves by a sliding stroke.

2. The armrest according to claim 1, wherein the hook knob is positioned below a center of rotation of the sliding knob and the multi-link is positioned above the center of rotation of the sliding knob.

3. The armrest according to claim 1, wherein spring elastic force is applied to each of the hook knob and the sliding knob, the spring elastic force being exerted as elastic restoring force when the hook knob and the sliding knob are returned to their initial states.

4. The armrest according to claim 3, wherein a hook pushed end which is pushed by the rotation of the sliding knob is formed in the hook knob so as to extend toward one direction from a center of rotation of the sliding knob and a hook pushing end for pressing the hook pushed end is formed in the sliding knob to extend toward the one direction from the center of rotation of the sliding knob.

5. The armrest according to claim 1, wherein the sloping angle rotation comprises sloping angle rotation of the sliding knob caused by a separation distance shared by the link bar and a center of rotation of the sliding knob and sloping angle rotation of the interlock caused by a separation distance shared by the link bar and a center of rotation of the interlock;
the linear movement is formed by both the sloping angle rotation of the sliding knob and the sloping angle rotation of the interlock;
the rotation of the interlock is generated by the separation distance shared by the link bar and the center of rotation of the interlock; and
the rotation of the sliding hook is generated through pushing by the rotation of the interlock applied from a position deviated from a center of rotation of the sliding hook.

6. The armrest according to claim 1, wherein the link bar comprises a straight link bar body.

7. The armrest according to claim 1, wherein the interlock comprises an interlock body having a center of rotation offset to one side,
the interlock body includes upper and lower pushing ends extended therefrom toward an opposite side of the center of rotation,
the upper pushing end rotates the sliding hook at a position before the armrest module moves by the sliding stroke, and
the lower pushing end presses against the hook knob to release the console locking force at a position after the armrest module moves by the sliding stroke and simultaneously converts the rotation of the interlock to the reverse rotation by reaction force of the hook knob.

8. The armrest according to claim 7, wherein the upper pushing end and the lower pushing end form an open "C" shape in cross section.

9. The armrest according to claim 1, wherein the sliding hook comprises a sliding hook body having a center of rotation offset to one side so that rotation of the sliding hook body is generated by the interlock and the slide locking force is released by the rotation of the sliding hook.

10. The armrest according to claim 9, wherein spring elastic force is applied to the sliding hook body and the spring elastic force is exerted as elastic restoring force when the sliding hook is returned to its initial state.

11. The armrest according to claim 1, wherein the multilink further comprises an interlock cover, the interlock cover allowing the link bar and the interlock and the sliding hook to be integrally assembled in a series arrangement.

12. The armrest according to claim 1, wherein:
the rotation of the sliding knob, the rotation of the hook knob, and the rotation of the multi-link are generated about respective pins thereof; and
the pins are bound by E rings.

13. The armrest according to claim 1, wherein the armrest module is coupled to the hinge module and the hinge module is formed as a hinge center of the armrest module when the armrest module is operated to be bent backward.

14. An armrest console comprising:
the armrest of the claim 1, the armrest further comprising, a hinge module for forming a hinge center of the armrest module when the armrest module is operated to be bent backward; and
a console storage space exposed to the outside by bending the armrest backward.

15. The armrest console according to claim 14, wherein the console storage space is formed at an armrest section and a shift lever section and a center fascia section are connected to the armrest section.

16. A vehicle comprising:
the armrest of the claim 1, the armrest further comprising a hinge module for forming a hinge center of the armrest module when the armrest module is operated to be bent backward, and
an armrest console comprising an armrest section having a console storage space to be opened and closed by the armrest, a shift lever section connected to the armrest section, and a center fascia section connected to the shift lever section, and positioned between a driver seat and a passenger seat.

* * * * *